INVENTORS
ALPHONSE GAILLARD
FRANÇOIS LAURENTY
By Young & Thompson
Attys

United States Patent Office 3,694,167
Patented Sept. 26, 1972

3,694,167
DEVICE FOR THE CRYSTALLIZATION BY HEAT EXCHANGE OF A SOLUTE IN SOLUTION IN A LIQUOR
Alphonse Gaillard, Levallois, and Francois Laurenty, Le Touquet, France, assignors to Francois Laurenty, Le Touquet, France
Filed Dec. 30, 1969, Ser. No. 889,082
Claims priority, application France, Oct. 31, 1968, 182,652
Int. Cl. B01d 9/02, 9/04
U.S. Cl. 23—273 R    5 Claims

ABSTRACT OF THE DISCLOSURE

A crystallization device is provided having a crystallization enclosure which is divided into a plurality of vertical stages by a plurality of fluidization containers. Liquor for treatment is introduced at the lower portion of the enclosure and exhausted liquor is removed at the upper portion of the enclosure. A heat exchange fluid, for example a coolant, is circulated in the enclosure which is chosen for its immiscibility and chemical non-reactivity with the liquor. Fully grown crystals are used to cool the coolant before being removed from the enclosure in order to minimize energy losses.

---

The present invention relates to crystallization by heat transfer exchange of a solute in solution in a liquor in order to extract the said solute in crystalline form.

One of the aims of the invention, though not its sole aim, is the extraction of calcium nitrate from the lime contained in natural phosphates, after reacting the phosphates with nitric acid.

As is known, the above mentioned reaction produces phosphoric acid formed as a soluble salt assimilable by plants.

From the liquor thus reacted, the calcium nitrate can be taken out of solution by cooling, the calcium nitrate is thus precipitated in the form of tetrahydrated crystals.

This cooling is effected by subjecting the liquor to be treated confined in a crystallizer, with a cooling agent outside the crystallizer or by circulating in the crystallizer a cooling fluid which is immiscible and chemically non-reactive with the said liquor.

Known installations for carrying out such a method present many disadvantages.

First of all, the crystals formed are removed from the bottom of the crystallizer whereas the liquor to be treated is introduced at the top of the crystallizer. Accordingly, the crystals removed are relatively cold and carry away with them much of the cooling potential of the liquor corresponding to the latent heat of crystallization which in turn corresponds to the previous cooling of the liquor. The result is an increased consumption of energy for cooling.

Further, no granulometric grain size classification is carried out among the crystals and the granulometric grain size range is therefore quite broad.

Furthermore, the minimum diameter of the crystals which is obtainable is always relatively reduced. The reason for this is that in present installation the crystalline germs or seeds develop spontaneously; the spontaneous germination or seeding weakens the solution treated and necessarily limits the growth of the largest crystals developed from previous germination.

Finally, the groups of crystals are formed in a liquor whose strength is continually diminishing, the equipment necessary for a given crystallization is voluminous and the yield per hour is low.

An object of the present invention is to provide a crystallization device which overcomes these disadvantages.

The crystallization device according to the invention is of the type comprising a vertical crystallization enclosure in which the liquor to be treated is introduced in a heat transfer fluid chosen for being immiscible and chemically non-reactive with the said liquor, the heat exchange fluid being introduced into the said enclosed space at a temperature other than that of the said liquor, and is characterized in that the liquor is introduced at the lower part of the said enclosure, the exhausted liquor being removed at the upper part of the said enclosure, and the said enclosure containing a fluidization container through which is introduced the heat exchange fluid above the inlet of the liquor to be treated.

This device has a double advantage.

On one hand, the fluidization process effects by itself a sizing of crystals; and alone succeeds in effectively carrying towards the bottom of the crystallizer the crystals sufficiently heavy, i.e. the crystals having a sufficient diameter, the finest crystals being maintained in suspension in the crystallizer until each of them has reached a predetermined diameter.

On the other hand, the crystals leaving which are cold are washed by the entering liquor, and further this liquor is advantageously cooled by the crystals, the crystals removed therefore take with them only the cooling potential which corresponds to their heat of crystallization, which results in substantial savings in energy.

Accoring to a preferred embodiment, there are a plurality of fluidization containers or casings spread out along the height of the crystallization enclosure and each of the fluidization containers is associated with a decanting space, for collecting the heat exchange fluid and carrying it to the following fluidization container, the heat transfer fluid circulating from one container to another opposite the circulation of the liquor being treated.

Owing to such a division of the crystallization enclosure into a plurality of stages in the preferred embodiment, the temperature differential of the fluid between adjacent stages is sufficiently reduced in order to maintain the conditions of crystallization between the equilibrium curve of crystals having an infinite surface and the curve of spontaneous germination.

All prolific spontaneous germination is thus prevented, the crystallization preceding with preference to increasing the size of pre-existing crystals.

In this regard and according to an additional characteristic of the invention means for fragmentation such as a grinder or liquidizer is preferably placed above the uppermost fluidization container in the crystallization enclosure.

This positioning advantageously enables an increase in a controlled manner the number of crystals which will grow larger.

Finally, according to a further additional characteristic of the invention, which is preferable but not essential, the crystallization enclosure has a rectangular transverse section which is the same as the fluidization containers, the said containers each being connected to the enclosure on at least three sides and being staggered relative to one another along the height thereof.

Owing to this configuration, the fluidization stream carries along the crystals in direction of the lower part of the crystallization enclosure, is preferably zigzag, which improves efficiency and the yield of the installation.

The features as well as others attempt to provide a crystallization device whose space requirements are substantially reduced thus diminishing investment costs; producing a better yield; and appreciably reducing the loss of cooling potential compared to that provided by comparable prior art devices.

Further characteristics and advantages of the invention will become evident from the description which follows, made by way of example, with reference to the accompanying schematic drawings, in which.

Figure 1:
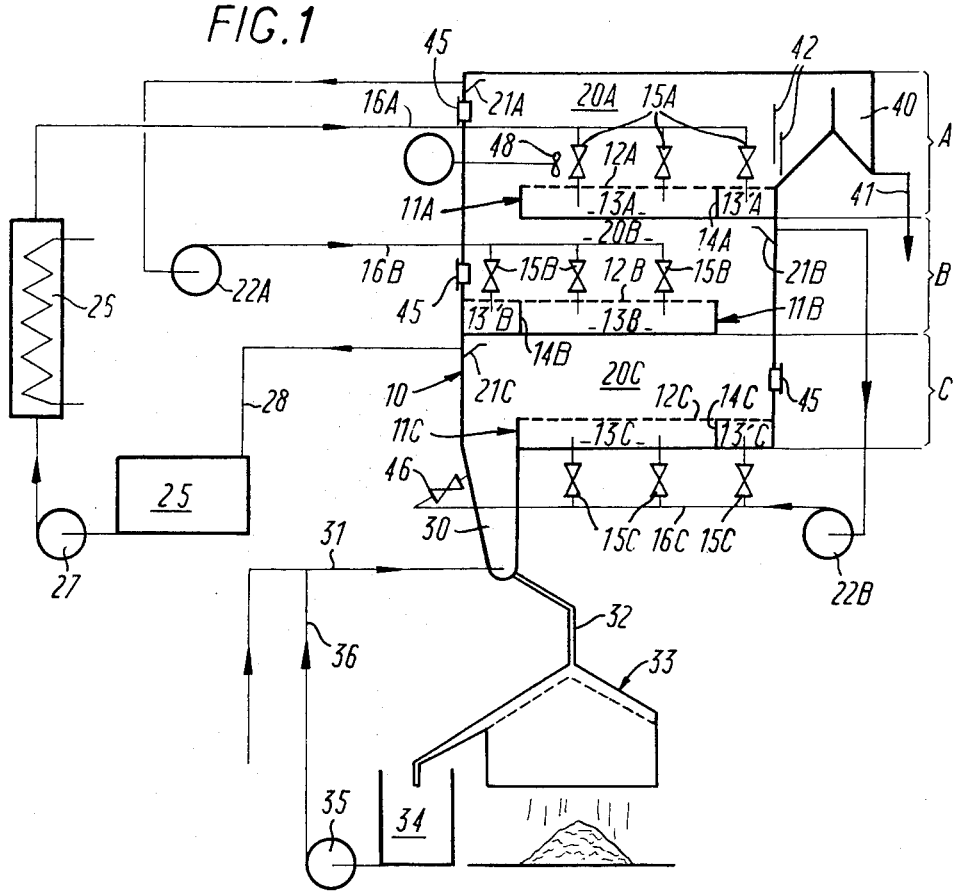
FIG. 1 is a combined block diagram of a crystallization device according to the invention.
Figure 2:
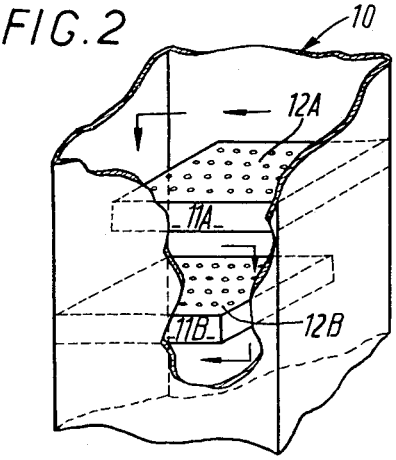
FIG. 2 is a partial view in perspective of the crystallization enclosure of this device.

According to the embodiment shown in these drawings, the crystallization device according to the invention includes a vertical enclosure 10 having a rectangular cross-section which is divided by fluidization containers or casings 11A, 11B 11C into successive stages A, B, C; the stage A being the uppermost.

For reasons of adjustment which will be better understood hereinafter, the container 11A is preferably divided into two distinct chambers 13A, 13'A by an interior wall 14A and a plurality of inlet valves 15A associated with the container 11A and spread out horizontally and connected in parallel with a common feed conduit 16A.

Analogous arrangements are provided for the container 11B: chambers 13B, 13'B separated by a wall 14B, valves 15B, and inlet conduit 16B; and for container 11C: chambers 13C, 13'C separated by a wall 14C, valves 15C and inlet conduit 16C.

The containers 11A, 11B, 11C are staggered relative to one another along the height of the enclosure 10, thereby providing amongst themselves from one stage to another in the enclosure, a freely circulating flow whose flow pattern is a zigzag.

A decanting space 20A, 20B, 20C is disposed above each of the containers 11A, 11B, 11C, respectively and each of these decanting spaces is provided at its upper part with a collector 21A, 21B, 21C respectively.

The combination formed by the fluidization container its corresponding decanting space and the collector thereof comprises a stage of the crystallization enclosure.

The collector 21A of the stage A is connected by a pump to the feeding conduit 16B of the fluidization container 11B of stage B; and similarly, the collector 21B of stage B is connected by a pump 22B to the feeding conduit 16C of the fluidization container 11C of stage C.

The feeding conduit 16A of the fluidization container 11A of the stage A is connected to a feeding and return vat 25 across a heat exchanger 26 and a pump 27; and similarly the collector 21C of stage C is connected to the feeding and return vat 25 by a return conduit 28.

The bottom part of the crystallization enclosure 10 is equipped with a collector or collecting hopper 30 into which feeds a conduit 31 and from which descends a removal conduit 32.

The conduit 32 feeds into a dryer 33, the liquid therefrom is collected in a vat 34 and carried back to the feeding conduit 31 through a conduit 36 by a pump 35.

The uppermost stage A of the crystallization enclosure 10 comprises, other than the collector 21A described above, a second collector 40, disposed opposite the collector 21A, and in the present example, at a lower level. A removal conduit 41 descends from the collector 40. In the interior of the enclosure 10 the deflectors 42 can be provided to isolate the collector 40.

The observation port 45 may in addition be provided as well as a supplementary fluidization delivery tube 46 at the level of the hopper 30, this delivery tube being fed by the feeding conduit 16C of stage C. Finally, the uppermost decanting space 20A is equipped with a liquidizer 48.

The crystallization device described above can be adapted to the crystallization of any solute in solution in a liquor. The operation will be described by way of example with reference to the extraction of calcium salts from a solution of natural phosphates reacted with nitric acid.

This solution, hereinafter called the reactive solution, is introduced into the crystallization enclosure 10 by the conduit 31 situated in the lower part of the enclosure.

The cooling necessary for crystallization of the calcium salts is provided by the auxiliary fluid, chosen for its immiscibility and its total chemical non-reactivity wth the reactive solution.

Such a fluid, hereinafter called the coolant can for example, be "white spirit."

A reserve of coolant is disposed in the vat 25. After the exchanger 26 has been cooled, the coolant is introduced into the crystallization enclosure 10 by the fluidization container 11A of stage A of the enclosure. After decanting, the coolant is collected in the hopper 21A, then directed to the fluidization container 11B of stage B. Collected in an analogous manner by the collector 21B, the coolant is introduced again in the enclosure 10 by the fluidization container 11C of the stage C of the enclosure. Collected finally by the collector 21C, the coolant is returned to the vat 25.

Thus, the coolant circulates from top to bottom in the enclosure 10, from one stage of the enclosure to another.

Concurrently, the reactive solution circulates continuously from bottom to top in the enclosure.

The coolant thus removes in a "methodical" manner flowing in the same direction as the liquor calories from the reactive solution.

The reactive solution depleted in solute, and then, as it rises in the enclosure 10, it becomes lighter. This effect cooperates with the circulation from bottom to top provided according to the invention for this solution while avoiding the formation of auxiliary currents which would short crcuit all or part of the enclosure.

In a similar manner, the coolant becomes warmer and lighter which facilitates the decantaing towards the top of each of the decanting spaces.

The calcium nitrate crystals formed, maintained in fluidization by the coolant, reach gradually, by decanting and while growing, the lower part of the enclosure, where they are collected by the hopper 30. The only crystals which reach the hopper have a diameter sufficiently large that their decanting has effectively occurred in opposition to the reverse flow of the fluidization.

From the hopper 30, the crystals are directed to the dryer 33.

As for the exhausted solution, it leaves from the collector 40 by the condiut 41 from which it can be directed to another plant (not shown) for treatment.

It will be noted that in the hopper 30 the crystals which are leaving are washed by the reactive solution entering to which a good part of their cooling potential is given up. The reactive solution carried by the crystals is collected in 34 by the dryer 33 and is returned to the hopper 30.

So that it will be understood, the observation ports 45 permit the successful control of the crystallization and the valves 15A, 15B, 15C permit a better regulation of the fluidization of the crystals formed. With regard to the agitator 48, it permits the control by fragmentation of large crystals the number of the crystals to be grown.

It is inferred above that the number of stages in the crystallization enclosure is three. This number could of course be different. It is preferably chosen so that the temperature in the reactive solution stay in the vicinity of the coolant, or in other words, so that in each stage the drop of temperature of the reactive solution is relatively small.

The maintainance of these conditions for reasons which will appear below is facilitated by the methodical or same direction circulation of the fluids within each stage involved according to the invention.

In practice, the number of stages will be determined for each application by a trial run in a manner similar to that which will be described with reference to the crystallization diagram shown in FIG. 3.

In this diagram the temperature T is indicated along the abscissas and the concentration of the solute in the reactive solution along the ordinate. By experimentation the curve of the spontaneous germination $C_1$ and the curve the crystals having an infinite surface $C_2$ will have to at least be approximately determined.

$\Delta T$ is the total drop in temperature of the reactive solution in the crystallization enclosure; $\Delta T$ corresponds to the depletion of the solute $\Delta C$ in the reactive solution.

The crystallization enclosure will preferably be divided into A, B, C, . . . N stages in such a manner that the drops in temperature $T_a$, $T_b$, . . . $T_N$ which correspond to each of these stages is sufficiently small to be contained within the curves $C_1$ and $C_2$.

Thus, all undesirable spontaneous germination will be avoided.

Further, it is preferable by means of a trial run for each particular application to determine the volume of the crystallization enclosure.

This volume will be established as a function of time necessary to grow the crystals to the mean size considering the degree of fluidization undertaken.

Figure 3:
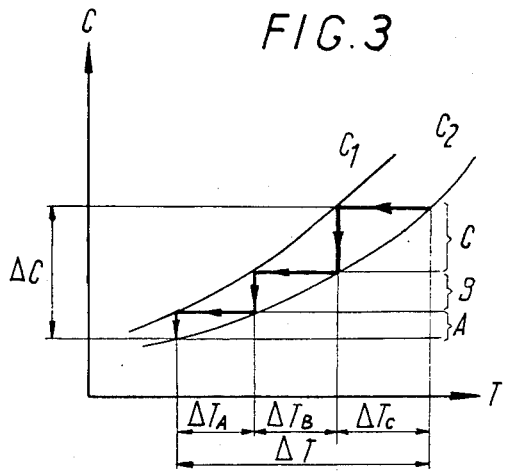
FIG. 3 is a concentration diagram.

The graphic representation in "stair steps" shown in FIG. 3 with regard to the change of temperature and concentration in each stage indicates no absolute values. This representation is merely a schematic showing of this change as a whole. It is obvious that such a temperature change will not be stepped but more continuous.

The present invention is of course not limited to the particular construction described and represented but includes all possible equivalents. Further, its application is not limited to the extraction of calcium salts in solution in a liquor of natural phosphates reacted with nitric acid, but extends to a manner general of crystallization by heat exchange heating or cooling, of any solute in solution in a solvent. Further, the agitator 48 or other means of fragmentation, instead of being disposed in the decanting space above the fluidization container 11A could be disposed in another space or along any appropriate fluid flow for example in any of the connecting conduits.

We claim:

1. A device for the crystallization with a heat-transfer fluid of a crystal-forming solute in solution in a liquor, the heat-transfer fluid being immiscible with and having lower specific gravity than and chemically nonreactive with the liquor, comprising a crystallization enclosure, a plurality of superposed stages, each of said stages including a fluidization container which is closed at its bottom and sides and has a perforate top wall, means for introducing the liquor with crystal-forming solute below the lowermost fluidization container, means for removing exhausted liquor from the top of the enclosure, means for feeding heat-transfer fluid from a heat exchanger into the fluidization container of the top stage, heat-transfer fluid collectors in each stage for removing the heat-transfer fluid from the upper portion of each stage, conduit means for transporting the heat transfer fluid removed from each stage to the fluidization container of the next lower stage, each stage having a decantation passage above its associated fluidization container for the passage of the liquor upwardly and the crystals downwardly between adjacent stages, such that within each stage the heat-transfer fluid rises to its associated collector, the liquor rises toward the next adjacent stage and the crystals fall, said fluidization containers being alternately laterally staggered as respects adjacent stages, said decantation passages being located laterally adjacent the fluidization container of the next higher stage and laterally staggered as respects adjacent stages, and conduit means conducting the heat-transfer fluid from said collector of the bottom stage to said heat exchanger.

2. A device as claimed in claim 1, wherein the temperature of the heat transfer fluid when it is introduced into the enclosure is lower than the temperature of the liquor when it is introduced into the enclosure.

3. A device as claimed in claim 1, wherein the cross-sections of the containers and the enclosure are rectangular, and each of the containers being connected on at least three of its sides to the enclosure.

4. A device as claimed in claim 1, wherein at least one of the fluidization containers are divided into at least two chambers, and wherein the means for introducing the heat transfer fluid into the fluidization means includes a plurality of independent feeding pipes arranged in parallel, and each of the feeding pipes being provided with a regulating valve.

5. A device as claimed in claim 1, further comprising agitator means disposed above the fluidization container in the uppermost stage.

References Cited
UNITED STATES PATENTS

| | | | |
|---|---|---|---|
| 2,085,521 | 6/1937 | Anderson | 62—58 X |
| 2,451,433 | 10/1948 | Davis | 23—270.5 X |
| 2,632,720 | 3/1953 | Perry | 23—270.5 X |
| 2,747,973 | 5/1956 | Hinrichs | 23—270.5 X |
| 2,813,918 | 11/1957 | Findlay | 23—270.5 X |
| 2,895,809 | 7/1959 | Pohlevy | 23—270.5 |
| 2,912,377 | 11/1959 | Lehrian | 261—114 X |
| 3,179,712 | 4/1965 | Carson | 23—270.5 X |
| 3,227,649 | 1/1966 | Ghormley | 23—270.5 X |
| 3,298,932 | 1/1967 | Bauer | 261—114 X |
| 3,556,736 | 1/1971 | Boyd | 261—114 R |

NORMAN YUDKOFF, Primary Examiner

S. J. EMERY, Assistant Examiner

U.S. Cl. X.R.

23—270 R, 271, 273 F, 295; 62—58; 261—124, 114; 55—94